US007871962B2

(12) United States Patent
Patel et al.

(10) Patent No.: US 7,871,962 B2
(45) Date of Patent: Jan. 18, 2011

(54) FLAT RHEOLOGY DRILLING FLUID

(75) Inventors: Arvind D. Patel, Sugar Land, TX (US); Jim Friedheim, Spring, TX (US); John Lee, Sugar Land, TX (US); Burnham Hoxha, Houston, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 10/647,737

(22) Filed: Aug. 25, 2003

(65) Prior Publication Data
US 2005/0049147 A1 Mar. 3, 2005

(51) Int. Cl.
*C09K 8/36* (2006.01)
*C09K 8/34* (2006.01)
(52) U.S. Cl. .................... 507/131; 507/138
(58) Field of Classification Search ............ 507/103, 507/131, 138, 244, 260; 516/27, 29
See application file for complete search history.

(56) References Cited

U.S. PATENT DOCUMENTS

| 2,873,253 | A | * | 2/1959 | Stanphill | 507/90 |
| 2,994,660 | A | * | 8/1961 | Reddie et al. | 507/131 |
| 3,127,343 | A | * | 3/1964 | Reddie et al. | 507/129 |
| 3,654,177 | A | * | 4/1972 | Foley | 516/27 |
| 3,728,277 | A | * | 4/1973 | Foley | 516/27 |
| 4,010,111 | A | * | 3/1977 | Chappell et al. | 252/391 |
| 4,663,076 | A | * | 5/1987 | Clapper et al. | 516/27 |
| 4,941,983 | A | * | 7/1990 | Coates et al. | 507/107 |
| 5,027,901 | A | * | 7/1991 | French et al. | 166/310 |
| 5,237,080 | A | | 8/1993 | Daute | |
| 5,254,531 | A | | 10/1993 | Mueller et al. | |
| 5,441,927 | A | | 8/1995 | Mueller et al. | |
| 5,869,433 | A | | 2/1999 | Patel | |
| 5,960,878 | A | * | 10/1999 | Nguyen et al. | 166/276 |
| 6,017,854 | A | * | 1/2000 | Van Slyke | 507/118 |
| 6,289,989 | B1 | | 9/2001 | Mueller et al. | |
| 6,339,048 | B1 | * | 1/2002 | Santhanam et al. | 507/131 |
| 6,861,393 | B2 | * | 3/2005 | Temple et al. | 507/119 |
| 7,345,010 | B2 | | 3/2008 | Thompson et al. | |
| 2001/0009890 | A1 | | 7/2001 | Patel et al. | |
| 2003/0114316 | A1 | | 6/2003 | Patel et al. | |
| 2004/0102332 | A1 | | 5/2004 | Thompson et al. | |

FOREIGN PATENT DOCUMENTS

| CA | 2088697 | | 2/1992 |
| WO | WO 8911516 A | * | 11/1989 |
| WO | WO-95/26386 A1 | | 10/1995 |
| WO | WO-96/22342 A1 | | 7/1996 |
| WO | WO-02/053675 A1 | | 7/2002 |
| WO | WO-02/053676 A1 | | 7/2002 |

OTHER PUBLICATIONS

Product Data Sheet for DURATONE HT (2006).*
Product Data Sheet for RM-63 (2006).*
Product Data Sheet for RM-63™, provided by Baroid Fluid Services of Halliburton (2006).*
Material Safety Data Sheet for RM-63™, provided by Halliburton (2008).*
International Search Report, Dec. 16, 2004.
Kim Burrows et al., "New Low Viscosity Ester is Suitable for Drilling Fluids in Deepwater Applications," SPE/IADC 66553, presented at the SPE/EPA/DOE Exploration and Production Environmental Conference held in San Antonio, Texas, Feb. 26-28, 2001, (pp. 1-14).
Baroid Drilling Fluids PETROFREE Biodegradable Invert Emulsion Drilling Fluid (1993) & RM-63 Rheology Modified (1990) product brochures (10 pages).
L. Knox et al., "New Developments in Ester-based Mud Technology," AADE-02-DFWM-HO-41, presented at the AADE 2002 Technology Conference held in Houston, Texas, Apr. 2-3, 2002 (pp. 1-9).
L.. Fraser, "Field Application of the All-Oil Drilling Fluid Concept," IADC/SPE 19955, presented a the 1990 IADC/SPE Drilling Conference held in Houston, Texas, Feb. 27-Mar. 2, 1990 (pp. 363-370).
C. Cameron, "Drilling Fluid Design and Management for Extended Reach Drilling," IADC/SPE 72290, presented at the IADC/SPE Middle East Drilling Technology meeting held in Bahrain, Oct. 22-24, 2001 (pp. 1-7).
Daniel Eckhout et al., "Development Process and Field Applications of a New Ester-based Mud System for ERD Wells on Australia's Northwest Shelf," IADC/SPE 62791, presented at the 2000 IADC/SPE Asia Pacific Drilling Technology meeting held in Kuala Lumpur, Malaysia, Sep. 11-13, 2000 (pp. 1-14).
Luigi F. Nicora et al., "High-Density Invert-Emulsion System with Very Low Solids Content to Drill ERD and HPHT Wells," SPE 65000, presented at the 2001 SPE International Symposium on Oilfield Chemistry held in Houston, Texas, Feb. 13-16, 2001(pp. 1-17).
M. Mas et al., "A New High-Temperature Oil-Based Drilling Fluid," SPE 53941, presented at the 1999 SPE Latin American and Caribbean Petroleum Engineering Conference held in Caracas, Venezuela, Apr. 21-23, 1999 (pp. 1-14).
Canadian Office Action issued in Patent Application No. 2,512,841 dated Apr. 25, 2008 (3 pages).

* cited by examiner

*Primary Examiner*—Michael J Feely
(74) *Attorney, Agent, or Firm*—Osha • Liang LLP

(57) ABSTRACT

A drilling fluid having an oleaginous fluid that forms the continuous phase; a non-oleaginous fluid, which is the discontinuous phase; a primary emulsifier in sufficient concentration to stabilize the invert emulsion; and a rheology modifier, which serves to moderate the rheology change across a temperature range of 40 to 150° C. The rheology modifier may be a dimer poly-carboxylic $C_{12}$ to $C_{22}$ fatty acid, trimer poly-carboxylic $C_{12}$ to $C_{22}$ fatty acid, tetramer poly-carboxylic $C_{12}$ to $C_{22}$ fatty acid, mixtures of these acids, or a polyamide wherein the polyamide is the condensation reaction product of a $C_{12}$-$C_{22}$ fatty acid and a polyamine selected from the group consisting of diethylenetriamine, triethylenetetramine; and pentaethylenetetramine. The drilling fluid preferably includes a weighting agent or bridging agent which may be selected from galena, hematite, magnetite, iron oxides, illmenite, barite, siderite, celestite, dolomite, calcite as well as combinations and mixtures of these and similar compounds. Optionally organophillic clay, fluid loss agents, alkali reserve materials, and other conventional invert emulsion drilling fluid components may be added to the drilling fluid.

1 Claim, No Drawings

FLAT RHEOLOGY DRILLING FLUID

BACKGROUND

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the hole, and maintain stability in the borehole's uncased sections. The drilling fluid should also form a thin, low permeability filter cake that seals openings in formations penetrated by the bit and act to reduce the unwanted influx of formation fluids from permeable rocks.

Drilling fluids are typically classified according to their base material. In oil base fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase. Pneumatic fluids are a third class of drilling fluids in which a high velocity stream of air or natural gas removes drill cuttings.

Oil-based drilling fluids are generally used in the form of invert emulsion muds. An invert emulsion mud consists of three-phases: an oleaginous phase, a non-oleaginous phase and a finely divided particle phase. Also typically included are emulsifiers and emulsifier systems, weighting agents, fluid loss additives, alkalinity regulators and the like, for stabilizing the system as a whole and for establishing the desired performance properties. Full particulars can be found, for example, in the Article by P. A. Boyd et al entitled "New Base Oil Used in Low-Toxicity Oil Muds" in the Journal of Petroleum Technology, 1985, 137 to 142 and in the Article by R. B. Bennet entitled "New Drilling Fluid Technology-Mineral Oil Mud" in Journal of Petroleum Technology, 1984, 975 to 981 and the literature cited therein.

It is important that the driller of subterranean wells be able to control the rheological properties of drilling fluids. In the oil and gas industry today it is desirable that additives work both onshore and offshore and in fresh and salt-water environments. In addition, as drilling operations impact on plant and animal life, drilling fluid additives should have low toxicity levels and should be easy to handle and to use to minimize the dangers of environmental pollution and harm to operators. Any drilling fluid additive should also provide the desired results but at the same time the additive should not inhibit the desired performance of other components of the drilling fluid. The development of such additives will help the oil and gas industry to satisfy the long felt need for superior drilling fluid additives which act to control the rheological properties of drilling fluids.

SUMMARY

The subject matter of the present disclosure is generally directed to a drilling fluid formulated to include: an oleaginous fluid that forms the continuous phase; a non-oleaginous fluid that forms the discontinuous phase, a primary emulsifier which is in sufficient concentration to stabilize the invert emulsion; and a rheology modifier selected to substantially achieve the result disclosed above. It is preferred that the rheology modifier is a concentration sufficient to achieve the result described above and is selected from poly-carboxylic fatty acids and poly-amides. In one preferred illustrative embodiment, the poly-carboxylic fatty acid dimer poly-carboxylic $C_{12}$ to $C_{22}$ fatty acid, trimer poly-carboxylic $C_{12}$ to $C_{22}$ fatty acid, tetramer poly-carboxylic $C_{12}$ to $C_{22}$ fatty acid, mixtures of these acids as well as combinations and mixtures of these and similar compounds that should be known to one of skill in the art. For another illustrative embodiment, the rheology modifier is a poly-amide or mixtures polyamides formed from the condensation reaction of $C_{12}$ to $C_{22}$ fatty acid and di- tri- tetra- and penta-ethylenepolyamines and the resulting similar compounds that should be known to one of skill in the art. As noted above, the oleaginous fluid utilized in the present illustrative embodiment forms the continuous phase and is about 30% to about 100% by volume of the drilling fluid and preferably is selected from diesel oil, mineral oil, synthetic oil, esters, ethers, acetals, di-alkylcarbonates, olefins, as well as combinations and mixtures of these and similar compounds that should be known to one of skill in the art. In another illustrative embodiment, the non-oleaginous fluid composes the discontinuous phase and is about 1% to about 70% by volume of said drilling fluid with preferred non-oleaginous fluid being selected from fresh water, sea water, a brine containing organic or inorganic dissolved salts, a liquid containing water-miscible organic compounds, as well as combinations and mixtures of these and similar compounds that should be known to one of skill in the art.

An illustrative primary emulsifier should be present in sufficient concentration to stabilize the invert emulsion and preferably is selected from compounds including fatty acids, soaps of fatty acids, amidoamines, polyamides, polyamines, oleate esters, such as sorbitan monoleate, sorbitan dioleate, imidazoline derivatives or alcohol derivatives and combinations or derivatives of the above. Blends of these materials as well as other emulsifiers can be used for this application, as well as combinations and mixtures of these and similar compounds that should be known to one of skill in the art. In one illustrative embodiment a weighting agent or a bridging agent are optionally included in the drilling fluid and ins such instances the weighting agent or bridging agent is selected from galena, hematite, magnetite, iron oxides, illmenite, barite, siderite, celestite, dolomite, calcite as well as combinations and mixtures of these and similar compounds that should be known to one of skill in the art. As previously noted, the illustrative fluids may also include conventional components of invert emulsion drilling muds, including, but not limited to: fluid loss control agents, alkali reserve materials, and other conventional invert emulsion drilling fluid components that should be well known to one of skill in the art.

Another illustrative embodiment of the disclosed subject matter includes a drilling fluid that includes: an oleaginous fluid, whish forms the continuous-phase of the drilling fluid; a non-oleaginous fluid, which forms the discontinuous phase of the drilling fluid; a primary emulsifier that is in sufficient concentration to stabilize the invert emulsion; an organophillic clay; and a rheology modifier. The rheology modifier that is used in the illustrative embodiment may be a poly-carboxylic fatty acids, noted above. In an alternative illustrative embodiment, the rheology modifier is a poly-amide as noted above. As previously noted above, the oleaginous fluid component of the present illustrative embodiment is from about 30% to about 100% by volume of the drilling fluid and is composed of a material selected from diesel oil, mineral oil, synthetic oil, esters, ethers, acetals, di-alkylcarbonates, olefins, as well as combinations and mixtures of these and similar compounds that should be known to one of skill in the art. Similarly, the non-oleaginous fluid utilized in the illustrative embodiment is from about 1% to about 70% by volume of said drilling fluid and is selected from fresh water, sea water, a brine containing organic or inorganic dissolved salts, a liquid containing water-miscible organic compounds, as well as combinations and mixtures of these and similar compounds that should be known to one of skill in the art. The illustrative fluids may also include conventional components of invert emulsion drilling muds, including, but not limited to: weighting or bridging agents, fluid loss control agents, alkali reserve materials, and other conventional invert emulsion drilling fluid components that should be well known to one of skill in the art. When a weighting agent or bridging agent is included, it may be selected from galena, hematite, magnetite, iron oxides, illmenite, barite, siderite, celestite, dolomite, calcite as well as combinations and mixtures of these and similar compounds that should be known to one of skill in the art.

One of skill in the art should also understand and appreciate that the claimed subject matter includes the use of the fluids disclosed herein during the drilling of a subterranean well.

These and other features are more fully set forth in the following description of preferred or illustrative embodiments of the disclosed and claimed subject matter.

DESCRIPTION OF ILLUSTRATIVE EMBODIMENTS

The present disclosure is generally directed to an oil base well bore fluid that is useful in the formulation of drilling, completing and working over of subterranean wells, preferably oil and gas wells. The fluids may also be used as packing fluids, fracturing fluids and other similar well bore uses in which flat rheology properties are desired. The usefulness of well bore fluids and invert emulsion fluids should be known to one of skill in the art as is noted in the book COMPOSITION AND PROPERTIES OF DRILLING AND COMPLETION FLUIDS, 5th Edition, H. C. H. Darley and George R. Gray, Gulf Publishing Company, 1988, the contents of which are hereby incorporated herein by reference.

In one embodiment of the disclosed subject matter, a well bore fluid is formulated to include an oleaginous fluid, a non-oleaginous fluid, a primary emulsifier, and a rheology modifier. Each of these components is disclosed in greater detailed below.

An oleaginous fluid is a liquid and more preferably is a natural or synthetic oil and more preferably the oleaginous fluid is selected from the group including diesel oil; mineral oil; a synthetic oil, such as polyolefins, polydiorganosiloxanes, siloxanes or organosiloxanes; and mixtures thereof. The concentration of the oleaginous fluid should be sufficient so that an invert emulsion forms and may be less than about 99% by volume of the invert emulsion. In one embodiment the amount of oleaginous fluid is from about 30% to about 95% by volume and more preferably about 40% to about 90% by volume of the invert emulsion fluid. The oleaginous fluid in one embodiment may include a mixture of internal olefin and alpha olefins. As is disclosed in a co-pending patent application entitled "ENVIRONMENTALLY FRIENDLY OLEFIN MIXTURE DRILLING FLUIDS", a combination of internal and alpha olefins can be used to create a drilling fluid having a balance of desirable properties such as toxicity and biodegradability. Specifically, in one illustrative embodiment a mixture of a $C_{16-18}$ internal olefin; a $C_{15-18}$ internal olefin; a $C_{15-16}$ internal olefin and a $C_{16}$ alpha olefin is made with a weight ratio of 5/2/1.5/1.5 respectively. This results in an oleaginous fluid having a balance of toxicity and biodegrability properties.

The non-oleaginous fluid used in the formulation of the invert emulsion fluid is a liquid and preferably is an aqueous liquid. More preferably, the non-oleaginous liquid may be selected from the group including fresh water, sea water, a brine containing organic and/or inorganic dissolved salts, liquids containing water-miscible organic compounds, combinations of these and similar compounds used in the formulation of invert emulsions. The amount of the non-oleaginous fluid is typically less than the theoretical maximum limit for forming an invert emulsion. Thus in one illustrative embodiment the amount of non-oleaginous fluid is less than about 70% by volume and preferably from about 1% to about 70% by volume. In another illustrative embodiment, the non-oleaginous fluid is preferably from about 5% to about 60% by volume of the invert emulsion fluid.

The primary emulsifier, utilized in the formulation of a drilling fluid in accordance with the teachings of the present disclosure, should be selected so as to form a useful and stable invert emulsion suitable for rotary drilling. The primary emulsifier should be present in a concentration sufficient to for a stable invert emulsion that is useful for rotary drilling. In one illustrative embodiment, the primary emulsifier is selected from The emulsifiers that have demonstrated utility in the emulsions of this invention are fatty acids, soaps of fatty acids, amidoamines, polyamides, polyamines, oleate esters, such as sorbitan monoleate, sorbitan dioleate, imidazoline derivatives or alcohol derivatives and combinations or derivatives of the above. Blends of these materials as well as other emulsifiers can be used for this application. Other surfactant compounds may be used in conjunction with the primary emulsifier utilized herein. In such cases it is important however that the quantity and nature of these supplemental surfactants should not interfere in the ability and properties given the invert emulsion fluid by the rheology modifying agent to act as described herein.

The rheology modifier of the present disclosure is utilized to reduce the increase in viscosity, i.e. flatten the rheological characteristics, of the drilling fluid over a temperature range from about 40° F. to about 150° F.). In one illustrative embodiment, the rheology modifier is a poly-carboxylic fatty acid. More preferably the poly-carboxylic fatty acid is trimeric and therefore at least three carboxyl groups in the molecule, and more preferably the trimeric poly-carboxylic acid is derived from tall oil or other similar unsaturated long chain carboxylic acids (i.e. fatty acids) having from 12 to 22 carbons. A particularly preferred embodiment is commercially available from M-I, of Houston Tex. as EMI-755. It should be noted that the poly-carboxylic fatty acids utilized in the present invention may include a dimer poly-carboxylic $C_{12}$ to $C_{22}$ fatty acid, trimer poly-carboxylic $C_{12}$ to $C_{22}$ fatty acid, tetramer poly-carboxylic $C_{12}$ to $C_{22}$ fatty acid, mixtures of these acids.

In another illustrative embodiment of the present invention, the rheology modifier is a proprietary polyamide based rheology modifier based on a mixture of amides and amines commercially available from M-I of Houston Tex. as EMI-756. When the rheology modifier is a polyamide, the polyamide is preferably the condensation reaction product of a $C_{12}$-$C_{22}$ fatty acid and a polyamine selected from the group consisting of diethylenetriamine, triethylenetetramine; and pentaethylenetetramine. Generally the condensation product is based on one equivalent of fatty acid for each equivalent of amine present in the amine starting material.

The concentration of the rheology modifier should be sufficient to achieve the results of the present invention. In one illustrative embodiment in which the rheology modifier is a trimeric poly-carboxylic acid of tall oil, the concentration of turmeric acid present in the drilling fluid may range from 0.1 to 5 pounds per barrel of drilling fluid and more preferably is from about 0.5 to 2 pounds per barrel of fluid. In another illustrative embodiment, the polyamide has a concentration greater than 0.1 and up to 5.0 pounds per barrel.

Although not wishing to be bound by any specific theory of action, it is believed that the relatively flat rheology profiles achieved by the present invention are the result of the interaction of the rheology modifier with the fine solids, such as organophillic clays and low-gravity solids present in the drilling fluid. It is believed that the interaction is somewhat temperature motivated in such a way that the enhancement is greater at higher temperatures and weaker at lower temperatures. One theory is that the change in temperature causes a change in the molecular confirmation of the rheology modifier such that at higher temperatures more molecular interactions and thus higher viscosity than is observed at lower temperatures. Alternatively, it is speculated that absorption/desorption of the rheology modifier onto the surfaces of the solids present in the fluid is related to the viscosity properties observed. Regardless of the mode of action, it has been found that the addition of the rheology modifiers, as disclosed herein, to drilling fluids results in the viscosity properties observed and disclosed below.

The disclosed drilling fluids are especially useful in the drilling, completion and working over of subterranean oil and gas wells. In particular the fluids are useful in formulating drilling muds and completion fluids for use in high deviation wells, and long reach wells. Such muds and fluids are especially useful in the drilling of horizontal wells into hydrocarbon bearing formations.

The method used in preparing the drilling fluids currently disclosed is not critical. Conventional methods can be used to prepare the drilling fluids of the present invention in a manner analogous to those normally used, to prepare conventional oil-based drilling fluids. In one representative procedure, a desired quantity of oleaginous fluid such as a base oil and a suitable amount of the primary emulsifier are mixed together followed by the rheology modifying agent and the remaining components are added with continuous mixing. An invert emulsion based on this fluid may be formed by vigorously agitating, mixing or shearing the oleaginous fluid with a non-oleaginous fluid.

The fluids of the present invention may further contain additional components depending upon the end use of the invert emulsion so long as they do not interfere with the functionality of the rheology modifying agents described herein. For example, alkali reserve, wetting agents, organophillic clays, viscosifiers, weighting agents, bridging agents and fluid loss control agents may be added to the fluid compositions of this invention for additional functional properties. The addition of such agents should be well known to one of skill in the art of formulating drilling fluids and muds.

It is conventional in many invert emulsions to include an alkali reserve so that the overall fluid formulation is basic (i.e. pH greater than 7). Typically this is in the form of lime or alternatively mixtures of alkali and alkaline earth oxides and hydroxides. One of skill in the art should understand and appreciate that the lime content of a drilling fluid will vary depending upon the operations being undertaken and the formations being drilled. Further it should be appreciated that the lime content, also known as alkalinity or alkaline reserve is a property that is typically measured in accordance with the applicable API standards which utilize methods that should be well know to one of skill in the art of mud formulation.

Wetting agents that may be suitable for use include, crude tall oil, oxidized crude tall oil, organic phosphate esters, modified imidazolines and amidoamines, alkyl aromatic sulfates and sulfonates, and the like, and combinations or derivatives of these. Versawet® and Versawet®NS are examples of commercially available wetting agents manufactured and distributed by M-I L.L.C. that may be used in the disclosed drilling fluids. Silwet L-77, L-7001, L7605 and L-7622 are examples of commercially available surfactants and wetting agents manufactured and distributed by Union Carbide Chemical Company Inc.

Organophillic clays, normally amine treated clays, may be useful as viscosifiers in the fluid compositions of the disclosed subject matter. The amount of organophillic clay used in the composition should be minimized to avoid an adverse effect upon the rheological properties of the present inventive drilling fluids. However, normally about 0.1% to 6% by weight range are sufficient for most applications. VG-69 and VG-PLUS are organo-clay materials distributed by M-I L.L.C., and Versa-HRP is a polyamide resin material manufactured and distributed by M-I L.L.C., that may be used in the claimed drilling fluids.

Weighting agents or density materials suitable for use in the described drilling fluids include galena, hematite, magnetite, iron oxides, illmenite, barite, siderite, celestite, dolomite, calcite, and the like. The quantity of such material added, if any, depends upon the desired density of the final composition. Typically, weight material is added to result in a drilling fluid density of up to about 24 pounds per gallon. The weight material is preferably added up to 21 pounds per gallon and most preferably up to 19.5 pounds per gallon.

Fluid loss control agents typically act by coating the walls of the borehole as the well is being drilled. Suitable fluid loss control agents which may find utility in this invention include modified lignites, asphaltic compounds, gilsonite, organophilic humates prepared by reacting humic acid with amides or polyalkylene polyamines, and other non-toxic fluid loss additives. Typically, fluid loss control agents are added in amounts less than about 10% and preferably less than about 5% by weight of the fluid.

The following examples are included to demonstrate preferred embodiments of the claimed subject matter. It should be appreciated by those of skill in the art that the techniques and compositions disclosed in the examples which follow represent techniques discovered by the inventors to function well and thus can be considered to constitute preferred modes of practice. However, those of skill in the art should, in light of the present disclosure, appreciate that many changes can be made in the specific embodiments which are disclosed and still obtain a like or similar result without departing from the scope of the claimed subject matter.

General Information Relevant to the Examples

These tests were conducted in accordance with the procedures in API Bulletin RP 13B-2, 1990. The following abbreviations are sometimes used in describing the results of experimentation.

"PV" is plastic viscosity, which is one variable used in the calculation of viscosity characteristics of a drilling fluid, measured in centipoise (cp) units.

"YP" is yield point, which is another variable used in the calculation of viscosity characteristics of drilling fluids, measured in pounds per 100 square feet (lb/100 ft$^2$).

"AV" is apparent viscosity, which is another variable, used in the calculation of viscosity characteristic of drilling fluid, measured in centipoise (cp) units.

"GELS" is a measure of the suspending characteristics, or the thixotripic properties of a drilling fluid, measured in pounds per 100 square feet (lb/100 ft$^2$).

"API F.L." is the term used for API filtrate loss in milliliters (ml).

"HTHP" is the term used for high-temperature high-pressure fluid loss, measured in milliliters (ml) according to API bulletin RP 13 B-2, 1990.

The components of the claimed drilling fluids include oleaginous fluid, a non-oleaginous fluid, an emulsifier package and a rheology modifier. Other chemicals used to make-up the system are basically the same as those typically used in formulating conventional invert drilling fluid systems. A description of individual components is given below:

EMI 595—is the main emulsifier is an amidoamine and has a chemistry and structure designed to minimize interactions with formation and drill solids. The recommended concentration is 7-8 ppb, but it can be used in concentrations varying from 5 to 10 ppb. However, higher concentrations may result in a minor thinning effect on rheology. The product is commercially available from Champion Chemicals and/or M-I LLC.

EMI-157—is an oleic acid based wetting agent and is used as a secondary emulsifier. The recommended concentration is 1-2 ppb. Concentrations over 2 ppb should be pilot tested for increase in rheology and sheen character of the system. The product is commercially available from M-I LLC.

EMI-755—is a trimer acid based rheology modifier. The flat rheology profile is generated using this rheology modifier. The compound is believed to enhance low-end rheology and yield point by interacting with fine solids such as organo clay and low-gravity solids. The interaction appears to be temperature dependent in such a way that the enhancement is greater at high temperature and weaker at low temperatures. It is believed that the interaction may be due to a change of the conformation of the trimer acid with temperature, such as that it may open up more at high temperatures thus generating more viscosity than at low temperatures; or due to adsorption/desorption from the surfaces of solids. The enhancement in low-end rheology and yield point can be affected by the amount of organo clay and fine low-gravity solids in the system. A larger amount of organo clays or fine low-gravity solids tends to cause a greater increase in these properties and a flatter profile. When using this compound as the rheology modifier, it is best to keep the low-gravity solids content in the 2-4% range. The recommended concentration is about 0.1 up to 5.0 ppb and preferably 1-2 ppb.

EMI-756—is a polyamide based viscosifier and rheology modifier that can be used to increase viscosity and improve sag control of the flat rheology system when needed. This viscosifier is chemically different from the trimer acid based rheology modifier, thus it interacts with solids differently. This polymer can generate high viscosity when added to a system containing a moderate to large amount of low-gravity solids, therefore pilot test is highly recommended before its addition. The recommended concentration is about 0.1 up to 5.0 ppb and preferably 0.25-1.0 ppb.

EMI-711—is a thinning agent that can be used to reduce overall rheology of the system without significantly changing the flat rheology profile. Because of its potency, EMI-711 should be pilot tested before adding to the active system. Typically, a treatment level of 0.25 ppb or less is a good starting point.

VG Plus—This organo clay is used at a minimal amount to provide some body and viscosity for proper barite suspension and gel strength. Typically, 1-2 ppb of this organo clay should be sufficient for this purpose. For high temperature applications or for barite sag controls, other organo clays, such as Bentone 42 and VG Supreme, may be used to replace VG Plus. VG Plus may be added in the form of pre-mix during drilling to maintain the flat rheology profile. VG-Plus, is commercially available from M-I LLC.

EcoTrol—is a fluid loss control agent. Typical concentration required is 0.5-1.0 ppb for the flat rheology system. Temperature and shear tend to facilitate the dispersing and solubilization of this product in the system.EcoTrol is commercially available from M-I LLC.

EXAMPLE 1

Base Mud Formulation and Property

The composition and mixing of three flat rheology fluids with mud weight ranging from 11.0 ppg to 15.6 ppg are shown in Table 1 as an illustration. Mixing of the disclosed drilling fluid formulations is not significantly different from the processed for mixing other invert emulsion fluids. Such processes should be well known to one of skill in the art of drilling fluid formulation. However, because the stabilizing effects from shearing, temperature, and drill solids are not available at mixing plant, the initial properties of a freshly made invert emulsion fluid can be quite different from a used field mud. To ensure that the initial properties of the EMS 4000 would approach its stabilized properties the emulsion stability of the fluid also need to be monitored often to ensure sufficient shearing has been applied. To maintain a low and flat rheology profile the S/W ratio, amounts of organo clay and rheology modifier were adjusted slightly according to the mud weight.

TABLE 1

Composition of flat rheology system of different synthetic/water ratio and mud weight. The recommended order of mixing is the same as the order the products are listed.

|  | 11.0 ppg | 13.0 ppg | 15.6 ppg |
|---|---|---|---|
|  |  | S/W Ratio |  |
|  | 70/30 | 75/25 | 80/20 |
| 1. Base (IO/AO Blend), bbls | 0.5714 | 0.5600 | 0.5278 |
| 2. VG Plus, ppb | 2 | 1 | 0.75 |
| 3. Lime, ppb | 3 | 3 | 3 |
| 4. EMI-595, ppb | 7 | 7 | 7 |
| 5. MI-157, ppb | 2 | 1.5 | 2 |
| 6. CaCl$_2$ brine, bbls | 0.2571 (20%) | 0.2023 (25%) | 0.1428 (25%) |
| 7. EcoTrol, ppb | 0.5 | 0.5 | 0.5 |
| 8. Barite, ppb | 185 | 290 | 442 |
| 9. EMI-755, ppb | 2 | 2.5 | 1.7 |

The rheological and HTHP fluid loss properties of the above flat rheology fluids after hot rollings are shown in Table 2. To demonstrate the flat rheology profile, the rheology of the fluids were measured using Fann 35A viscometer at 40° F., 70° F. & 100° F., or 40° F., 100° F. & 150° F. after hot rolling at 100° F. or 150° F. for 16 hours, respectively. Since the 11.0 ppg fluid was hot rolled only at 100° F., the measurement at 150° F. was considered irrelevant.

TABLE 2

Properties of typical flat rheology fluids after hot rolling (AHR) at temperatures indicated.

| Rheology at | 11.0 ppg, AHR at 100° F. | | | 13.00 ppg, AHR at 150° F. | | | 15.6 ppg AHR at 150° F. | | |
|---|---|---|---|---|---|---|---|---|---|
| | 40° F. | 70° F. | 100° F. | 40° F. | 100° F. | 150° F. | 40° F. | 100° F. | 150° F. |
| 600 | 104 | 73 | 60 | 106 | 62 | 45 | 128 | 65 | 50 |
| 300 | 59 | 41 | 35 | 62 | 38 | 30 | 72 | 37 | 31 |
| 200 | 43 | 31 | 27 | 46 | 29 | 25 | 53 | 28 | 25 |
| 100 | 27 | 20 | 20 | 29 | 20 | 19 | 31 | 19 | 18 |
| 6 | 10 | 10 | 12 | 9 | 11 | 11 | 8 | 8 | 10 |
| 3 | 9 | 9 | 12 | 8 | 10 | 10 | 7 | 8 | 9 |
| PV | 45 | 32 | 25 | 44 | 24 | 15 | 56 | 28 | 19 |
| YP | 14 | 9 | 10 | 18 | 14 | 15 | 16 | 9 | 12 |
| 10" Gel | 14 | 15 | 15 | 13 | 13 | 10 | 11 | 11 | 11 |
| 10' Gel | 22 | 21 | 22 | 22 | 17 | 14 | 20 | 18 | 20 |
| ES | | 290 | | | 670 | | | 520 | |
| HTHP FL | | 5.6 at 200° F. | | | 5.2 at 250° F. | | | 14.2 at 250° F. | |

Upon review of the above illustrative data, one of skill in the art should notice the similar rheology displayed despite different mud weights. Further it should be noticed that while there was a slight change in rheology of the mud formulation the change is less substantial than a comparable mud without the benefit of the rheology modifiers disclosed herein.

EXAMPLE 2

Effects of Content of Organo Clay and Rheology Modifier

Because the flat rheological properties were produced from the interaction of the rheology modifier and organo clays, it is necessary to investigate the effects of rheology modifier as a function of organo clay contents. A review of the resulting data illustrates the change of rheological properties as a function of the content of organo clay (C) and rheology modifier (RM). To facilitate a direct comparison, a graphical comparison is useful so long as the vertical scale is adjusted to the same in all three plots. One of skill in the art should notice in the above illustrative data that a trend of increasing properties with increasing content of organo clay and rheology modifier. Based on the initial data, it was concluded that the most effective system formulation would be one that contains 1-2 ppb of organo clays, 5-8 ppb of emulsifier, 1-2 ppb of wetting agent, 1-2 ppb of rheology modifier, and 0.5-1 ppb of fluid loss control agent.

EXAMPLE 3

Effects of Solids, Seawater, and Cement Contamination

Using the 13.0 ppg fluid as an example, the retention of the flat rheological property of the system in the event of drill solids, seawater, and cement contamination is illustrated in Table 3. Because the system is not 100% inert to contamination, some changes in rheological properties did occur after each contaminant was added, when compared with the contaminant-free base mud. One noticeable change is the increase in 10-min gel strength after solids contamination. This increase was attributed to the interaction of the rheology modifier and the low gravity solids.

TABLE 3

Effects of solids, seawater, cement contamination on a 13 ppg flat rheology mud. Notice the flat rheology profile is retained after the contamination, despite some noticeable changes in rheology.

| Rheology at | 13.0 ppg Base Mud | | | Base + 35 ppb OCMA Clay | | | Base + 10% Seawater | | | Base + 10 ppb Class G Cement | | |
|---|---|---|---|---|---|---|---|---|---|---|---|---|
| | 40° F. | 100° F. | 150° F. | 40° F. | 100° F. | 150° F. | 40° F. | 100° F. | 150° F. | 40° F. | 100° F. | 150° F. |
| 600 | 106 | 62 | 45 | 149 | 90 | 73 | 130 | 71 | 55 | 115 | 62 | 44 |
| 300 | 62 | 38 | 30 | 88 | 59 | 52 | 76 | 46 | 37 | 65 | 36 | 29 |
| 200 | 46 | 29 | 25 | 66 | 48 | 43 | 57 | 37 | 31 | 49 | 28 | 23 |
| 100 | 29 | 20 | 19 | 43 | 36 | 34 | 38 | 28 | 23 | 31 | 19 | 17 |
| 6 | 9 | 11 | 11 | 16 | 21 | 20 | 13 | 16 | 11 | 9 | 10 | 9 |
| 3 | 8 | 10 | 10 | 14 | 20 | 20 | 12 | 15 | 10 | 8 | 9 | 8 |
| PV | 44 | 24 | 15 | 61 | 31 | 21 | 54 | 25 | 18 | 50 | 26 | 15 |
| YP | 18 | 14 | 15 | 27 | 28 | 31 | 22 | 21 | 19 | 15 | 10 | 14 |
| 10" Gel | 13 | 13 | 10 | 22 | 26 | 24 | 19 | 17 | 11 | 15 | 12 | 9 |
| 10' Gel | 22 | 17 | 14 | 36 | 35 | 32 | 21 | 18 | 16 | 21 | 17 | 12 |
| ES | — | — | 670 | — | — | 660 | — | — | 230 | — | — | 630 |
| HTHP at 250° F. | | | 5.2 | | | 5.8 | | | 4.5 | | | 4 |

Upon review of the above illustrative data, one of skill in the art should understand and appreciate that in a comparison of the 6-rpm reading, YP, and 10' Gel strength of OCMA Clay, seawater, and cement contaminated fluids with base mud, the original flat rheology property is more or less retained after the contamination.

Similar contamination tests also have been conducted using the 11.0 ppg mud formulation. Because of the higher organo-clay in the formulation, the solids contamination resulted in a greater increase in rheology. However, when the system was properly diluted with a premix to maintain the original mud weight, the rheology dropped back to the desired range. Illustrative rheological changes of the 11.0 ppg system before and after the solids contamination and dilution are given in Table 4.

in wells with a low bottom hole temperature and short section length, the flat rheological property may not get fully developed and stabilized. Thus, it may be necessary to achieve the flat rheology disclosed herein with a freshly made fluid. In the process of trying to stabilize the flat rheological property of freshly made fluid, it was noticed that addition of lime may help to achieve this goal.

Table 5 shows the properties of two 11.0 ppg fluids (A and B) that were mixed under similar conditions with similar mud composition. The only difference is that the second fluid (B) had one extra pound of Lime added at the end of the mixing.

TABLE 4

Rheological properties of the 11.0 ppg system after solids contamination and 10% dilution with an unweighted base fluid having an 80/20 S/W ratio.

|  | 11.0 ppg Base AHR at 100° F. | | | Base + 35 ppb OCMA Clay AHR at 100° F. | | | Base + 35 ppb OCMA Clay + 10% Premix Dilution* After dilution | | |
|---|---|---|---|---|---|---|---|---|---|
|  | 40° F. | 70° F. | 100° F. | 40° F. | 100° F. | 150° F. | 40° F. | 100° F. | 150° F. |
| 600 | 106 | 72 | 59 | 162 | 113 | 92 | 119 | 90 | 77 |
| 300 | 59 | 39 | 34 | 94 | 70 | 62 | 69 | 55 | 50 |
| 200 | 43 | 29 | 26 | 71 | 56 | 51 | 52 | 44 | 41 |
| 100 | 26 | 20 | 18 | 47 | 40 | 40 | 34 | 31 | 31 |
| 6 | 9 | 9 | 11 | 21 | 25 | 28 | 15 | 17 | 20 |
| 3 | 8 | 9 | 10 | 21 | 24 | 27 | 15 | 17 | 20 |
| PV | 47 | 33 | 25 | 68 | 43 | 30 | 50 | 35 | 27 |
| YP | 12 | 6 | 9 | 26 | 27 | 32 | 19 | 20 | 23 |
| 10" Gels | 14 | 13 | 13 | 31 | 32 | 33 | 24 | 25 | 26 |
| 10' Gels | 20 | 18 | 17 | 42 | 40 | 42 | 36 | 37 | 36 |
| ES |  | 290 |  |  | 540 |  |  | 530 |  |

*Premix: 80/20 base containing 1 ppb VG Plus, 3 ppb Lime, 7 ppb EMI-595, 2 ppb MI-157 and 1 ppb EMI-755

One of skill in the art should appreciate that the above illustrative test results indicate that for the field trial the system properties can be maintained with proper dilution. Treatment with a small amount of thinner can be used to further reduce the rheology.

EXAMPLE 4

Addition of Lime

While testing the 11 ppg drilling fluid formulated as disclosed herein it was noticed that the flat rheology profile is more apparent after heat aging than before heat aging, indicating that time and temperature could be important factors that can stabilize the flat properties. For most applications where bottom hole temperature is above 150° F., the fluid system should stabilize after a few days of drilling. However,

TABLE 5

Adding one extra pound of Lime at the end of mixing tends to stabilize the flat rheology profile before heat aging. Both A and B fluids have same mud composition except Lime content.

| Rheology | 11 ppg-A | | | 11-ppg A, AHR | | | 11 ppg-B | | | 11 ppg-B, AHR | | |
|---|---|---|---|---|---|---|---|---|---|---|---|---|
| at | 40° F. | 70° F. | 100° F. | 40° F. | 70° F. | 100° F. | 40° F. | 70° F. | 100° F. | 40° F. | 70° F. | 100° F. |
| 600 | 121 | 98 | 76 | 104 | 73 | 60 | 98 | 78 | 63 | 107 | 73 | 60 |
| 300 | 82 | 69 | 52 | 59 | 41 | 35 | 57 | 47 | 42 | 60 | 41 | 35 |
| 200 | 68 | 56 | 43 | 43 | 31 | 27 | 43 | 37 | 34 | 45 | 30 | 27 |
| 100 | 50 | 42 | 32 | 27 | 20 | 20 | 29 | 27 | 26 | 29 | 21 | 20 |

TABLE 5-continued

Adding one extra pound of Lime at the end of mixing tends to stabilize the flat rheology profile before heat aging. Both A and B fluids have same mud composition except Lime content.

| Rheology at | 11 ppg-A | | | 11-ppg A, AHR | | | 11 ppg-B | | | 11 ppg-B, AHR | | |
|---|---|---|---|---|---|---|---|---|---|---|---|---|
| | 40° F. | 70° F. | 100° F. | 40° F. | 70° F. | 100° F. | 40° F. | 70° F. | 100° F. | 40° F. | 70° F. | 100° F. |
| 6 | 21 | 18 | 14 | 10 | 10 | 12 | 13 | 16 | 17 | 10 | 9 | 12 |
| 3 | 18 | 16 | 12 | 9 | 9 | 12 | 12 | 15 | 15 | 9 | 8 | 11 |
| PV | 39 | 29 | 24 | 45 | 32 | 25 | 41 | 31 | 21 | 47 | 32 | 25 |
| YP | 43 | 40 | 28 | 14 | 9 | 10 | 16 | 16 | 21 | 13 | 9 | 10 |
| 10" Gels | 18 | 16 | 14 | 14 | 15 | 15 | 18 | 19 | 18 | 13 | 15 | 15 |
| 10' Gels | 21 | 20 | 17 | 22 | 21 | 22 | 25 | 25 | 25 | 23 | 23 | 22 |
| ES | | 280 | | | 290 | | | 310 | | | 370 | |

Upon review one of skill in the art should appreciate that the extra pound of lime added at the end of the mixing, the second fluid displayed the desired flat rheology profile before hot rolling. However, after heat aging at 100° F., both fluids showed almost identical rheology, indicating that the effect of adding lime is somehow affected by the heat aging process.

It is believed that treatment with lime can be used to equip the freshly made fluid with the flat rheology property when such a property is needed at the mixing plant. It is also believed that cement probably would have pretty much the same effect on the system, when a freshly made fluid is used to drill cement. Thus if the freshly made mud is planned to drill cement, such treatment may not be needed at the mixing plant.

EXAMPLE 5

Effects of Thinner and Wetting Agent

Although the flat rheology system is designed to run most efficiently with a low content of drilled solids (2-4%), often time it may be necessary to treat the system with a thinner or wetting agent to reduce the overall viscosity and gel strength of the system, such as before running casing. Data illustrative of the effects of different thinners and wetting agents on the rheology of a 13 ppg EMS 4000 system loaded with 50 ppb of OCMA Clay have been evaluated and shows the effects of different thinners and wetting agents on the flat rheology property of a 13 ppg EMS 4000. The base mud contained 50 ppb of OCMA Clay as drill solids. The most effective thinners are NovaThin and EMI-711. Wetting agents such as MI-157 and NovaWet actually caused some increases in rheology. VersaWet showed least impact on the rheology.

Based on the test results, one of skill in the art should appreciate that NovaThin and EMI-711 provided very good thinning effects, whereas wetting agents showed some increases in rheology. Because of the powerful thinning effect of EMI-711, pilot test should be conducted before addition of the product is carried out on a rig.

EXAMPLE 6

Barite Sag

For extended reach applications, barite sag can cause various potential problems. A 13.0 ppg flat rheology system has been tested for barite sag control using a sag flow loop tester.

About 2.8 gallons of the test mud is circulated in the flow loop consisting of a plastic test tube (2" ID×6' long), a circulating pump, and a densitometer. The plastic tube can be adjusted at angles varying from vertical (0-degree) to horizontal (90-degree). Inside the plastic tube, a steel rod is used to simulate drill string and can be rotated at speeds varying from 0 to 225 rpm. For barite sag evaluation, the test normally is conducted at 60-degree inclination with varying pump rates (from 25 to 185 fpm annular velocity) and pipe rotations (from 0 to 225 rpm). Changes of mud weight due to sagging/settling of barite or other weighting agent in the test tube are determined by the densitometer under circulating conditions. After the sag test, the mud weight data were corrected to a constant temperature of 120° F. for comparison.

Upon review of the resulting data one of skill in the art should appreciate that the sag curves are plots of mud weight changes (mostly mud weight drop) observed during the 200-min test. The base mud run without OCMA Clay, which is not shown, had a greater mud weight drop due to its relatively low rheology profile. After the addition of OCMA Clay, however, the barite sag was significantly minimized due to an increase in rheology. Some stabilizing effect is also indicated by the leveled-off curve.

The system was treated with 1.0 ppb of EMI-756 and re-tested. Upon review one of skill in the art should notice that a further reduction in barite sag was observed with the treatment, which only caused 15-20% increase in rheology.

In view of the above disclosure, one of ordinary skill in the art should understand and appreciate that one illustrative embodiment of the claimed subject matter includes a drilling fluid formulated to include: an oleaginous fluid that forms the continuous phase; a non-oleaginous fluid that forms the discontinuous phase, a primary emulsifier which is in sufficient concentration to stabilize the invert emulsion; and a rheology modifier selected to substantially achieve the result disclosed above. It is preferred that the rheology modifier is a concentration sufficient to achieve the result described above and is selected from poly-carboxylic fatty acids and poly-amides. In one preferred illustrative embodiment, the rheology modifier is selected from the group consisting of a dimer poly-carboxylic $C_{12}$ to $C_{22}$ fatty acid, trimer poly-carboxylic $C_{12}$ to $C_{22}$ fatty acid, tetramer poly-carboxylic $C_{12}$ to $C_{22}$ fatty acid, mixtures of these acids, and polyamide wherein the polyamide is the condensation reaction product of a $C_{12}$-$C_{22}$ fatty acid and a polyamine selected from the group consisting of diethylenetriamine, triethylenetetramine; and pentaethylenetetramine. As noted above, the oleaginous fluid utilized in the present illustrative embodiment forms the continuous phase and is about 30% to about 100% by volume of the drilling fluid and preferably is selected from diesel oil, mineral oil, synthetic oil, esters, ethers, acetals, di-alkylcarbonates, olefins, as well as combinations and mixtures of these and similar compounds that should be known to one of skill in the art.

In another illustrative embodiment, the non-oleaginous fluid composes the discontinuous phase and is about 1% to about 70% by volume of said drilling fluid with preferred non-oleaginous fluid being selected from fresh water, sea water, a brine containing organic or inorganic dissolved salts, a liquid containing water-miscible organic compounds, as well as combinations and mixtures of these and similar compounds that should be known to one of skill in the art.

An illustrative primary emulsifier should be present in sufficient concentration to stabilize the invert emulsion and preferably is selected from compounds that should be known to one of skill in the art. In one illustrative embodiment a weighting agent or a bridging agent are optionally included in the drilling fluid and ins such instances the weighting agent or bridging agent is selected from galena, hematite, magnetite, iron oxides, illmenite, barite, siderite, celestite, dolomite, calcite as well as combinations and mixtures of these and similar compounds that should be known to one of skill in the art. As previously noted, the illustrative fluids may also include conventional components of invert emulsion drilling muds, including, but not limited to: fluid loss control agents, alkali reserve materials, and other conventional invert emulsion drilling fluid components that should be well known to one of skill in the art.

Another illustrative embodiment of the disclosed subject matter includes a drilling fluid that includes: an oleaginous fluid, whish forms the continuous phase of the drilling fluid; a non-oleaginous fluid, which forms the discontinuous phase of the drilling fluid; a primary emulsifier that is in sufficient concentration to stabilize the invert emulsion; an organophillic clay; and a rheology modifier. The rheology modifier that is used in the illustrative embodiment may be selected from the group consisting of a dimer poly-carboxylic $C_{12}$ to $C_{22}$ fatty acid, trimer poly-carboxylic $C_{12}$ to $C_{22}$ fatty acid, tetramer poly-carboxylic $C_{12}$ to $C_{22}$ fatty acid, mixtures of these acids, and polyamide wherein the polyamide is the condensation reaction product of a $C_{12}$-$C_{22}$ fatty acid and a polyamine selected from the group consisting of diethylenetriamine, triethylenetetramine; and pentaethylenetetramine. When a polyamide is used in one illustrative embodiment the polyamide is the condensation product of one mole of diethylenetriamine and three moles of $C_{12}$-$C_{22}$ fatty acid. As previously noted above, the oleaginous fluid component of the present illustrative embodiment is from about 30% to about 100% by volume of the drilling fluid and is composed of a material selected from diesel oil, mineral oil, synthetic oil, esters, ethers, acetals, di-alkylcarbonates, olefins, as well as combinations and mixtures of these and similar compounds that should be known to one of skill in the art. Similarly, the non-oleaginous fluid utilized in the illustrative embodiment is from about 1% to about 70% by volume of said drilling fluid and is selected from fresh water, sea water, a brine containing organic or inorganic dissolved salts, a liquid containing water-miscible organic compounds, as well as combinations and mixtures of these and similar compounds that should be known to one of skill in the art. The illustrative fluids may also include conventional components of invert emulsion drilling muds, including, but not limited to: weighting or bridging agents, fluid loss control agents, alkali reserve materials, and other conventional invert emulsion drilling fluid components that should be well known to one of skill in the art. When a weighting agent or bridging agent is included, it may be selected from galena, hematite, magnetite, iron oxides, illmenite, barite, siderite, celestite, dolomite, calcite as well as combinations and mixtures of these and similar compounds that should be known to one of skill in the art.

One of skill in the art should also understand and appreciate that the claimed subject matter includes the use of the fluids disclosed herein during the drilling of a subterranean well. In one such illustrative embodiment of a method of rotary drilling a subterranean well using a drilling fluid, the improvement includes using a drilling fluid that includes: an oleaginous fluid, a non-oleaginous fluid, a primary emulsifier, an organophillic clay; and a rheology modifier. The oleaginous fluid forms the continuous phase and the non-oleaginous fluid forms the discontinuous phase of the drilling fluid. The oleaginous fluid is from about 30% to about 100% by volume of the drilling fluid and are composed of a material selected from diesel oil, mineral oil, synthetic oil, esters, ethers, acetals, di-alkylcarbonates, olefins, as well as combinations and mixtures of these and similar compounds that should be known to one of skill in the art. The non-oleaginous fluid comprises from about 1% to about 70% by volume of the drilling fluid and the non-oleaginous fluid is selected from fresh water, sea water, a brine containing organic or inorganic dissolved salts, a liquid containing water-miscible organic compounds, as well as combinations and mixtures of these and other fluids that should be known to one of skill it the art. The primary emulsifier should be in sufficient concentration to stabilize the invert emulsion and can be selected from combinations and mixtures of these and other fluids that should be known to one of skill it the art. The flat rheology characteristics of the fluid are substantially imparted by the inclusion of the rheology modifier, which is selected from poly-carboxylic fatty acids and poly-amides. In one illustrative embodiment, the poly-carboxylic fatty acid is a mixture of poly-carboxylic acids added in sufficient concentration so that the trimeric poly-carboxylic fatty acid concentration in the drilling fluid is greater than 0.1 pounds per barrel and is up to 5.0 pounds per barrel. Another illustrative embodiment utilizes, a polyamide as the rheology modifier which is the condensation product of one mole of diethylenetriamine and three moles of $C_{12}$-$C_{22}$ fatty acid as well as combinations and mixtures of these and other compounds that should be known to one of skill it the art. As previously noted, the illustrative fluids may also include conventional components of invert emulsion drilling muds, including, but not limited to: weighting or bridging agents, fluid loss control agents, alkali reserve materials, and other conventional invert emulsion drilling fluid components that should be well known to one of skill in the art.

While the apparatus, compositions and methods disclosed above have been described in terms of preferred or illustrative embodiments, it will be apparent to those of skill in the art that variations may be applied to the process described herein without departing from the concept and scope of the claimed subject matter. All such similar substitutes and modifications apparent to those skilled in the art are deemed to be within the scope and concept of the subject matter as it is set out in the following claims.

What is claimed is:

1. A drilling fluid comprising:
   an oleaginous fluid, wherein the oleaginous fluid is the continuous phase of the drilling fluid and wherein the oleaginous fluid occupies from about 30% to about 95% by volume of the drilling fluid and the oleaginous fluid is selected from the group consisting of diesel oil, mineral oil, synthetic oil, esters, ethers, acetals, di-alkylcarbonates, olefins, and combinations thereof;
   a non-oleaginous fluid, wherein the non-oleaginous fluid is the discontinuous phase of the drilling fluid, wherein the non-oleaginous fluid occupies from about 5% to about 70% by volume of the drilling fluid and the non-oleaginous fluid is selected from the group consisting of fresh water, sea water, a brine containing organic or inorganic dissolved salts, a liquid containing water-miscible organic compounds, and combinations thereof;

an organophillic clay, wherein the organophillic clay is present in a concentration of about 0.1% to about 6% by weight;

a primary emulsifier, wherein the primary emulsifier is an amidoamine and is present in a concentration of 7 to 8 pounds per barrel;

a secondary emulsifier, wherein the secondary emulsifier is an oleic acid based wetting agent and is present in a concentration of 1 to 2 pounds per barrel;

a weighting or bridging agent, wherein the weighting or bridging agent is selected from the group consisting of galena, hematite, magnetite, iron oxides, illmenite, barite, siderite, celestite, dolomite, calcite and combinations thereof; and a rheology modifier, wherein the rheology modifier is a mixture of $C_{12}$ to $C_{22}$ poly-carboxylic fatty acids, including at least a dimer poly-carboxylic $C_{12}$ to $C_{22}$ fatty acid, and a trimer poly-carboxylic $C_{12}$ to $C_{22}$ fatty acid, wherein the mixture of poly-carboxylic fatty acids is added in sufficient concentration so that the trimeric poly-carboxylic fatty acid concentration in the drilling fluid is greater than 0.1 pounds per barrel and is up to 5.0 pounds per barrel.

\* \* \* \* \*